(12) United States Patent
Asai

(10) Patent No.: US 8,166,134 B2
(45) Date of Patent: Apr. 24, 2012

(54) SERVER SYSTEM, METHOD OF CONTROLLING OPERATION THEREOF AND CONTROL PROGRAM THEREFOR

(75) Inventor: Arito Asai, Asaka (JP)

(73) Assignee: Fujifilm Corporation, Tokyo (JP)

( * ) Notice: Subject to any disclaimer, the term of this patent is extended or adjusted under 35 U.S.C. 154(b) by 909 days.

(21) Appl. No.: 12/139,282

(22) Filed: Jun. 13, 2008

(65) Prior Publication Data

US 2009/0006580 A1 Jan. 1, 2009

(30) Foreign Application Priority Data

Jun. 27, 2007 (JP) ................................. 2007-169319

(51) Int. Cl.
*G06F 15/16* (2006.01)
(52) U.S. Cl. ......... 709/219; 709/203; 709/217; 709/218
(58) Field of Classification Search .................. 709/203, 709/217, 223, 224, 219
See application file for complete search history.

(56) References Cited

U.S. PATENT DOCUMENTS

| | | | | |
|---|---|---|---|---|
| 2002/0198882 A1* | 12/2002 | Linden et al. | .................. | 707/10 |
| 2003/0051100 A1* | 3/2003 | Patel | ............................. | 711/118 |
| 2005/0076097 A1* | 4/2005 | Sullivan et al. | ............... | 709/218 |
| 2007/0124693 A1* | 5/2007 | Dominowska et al. | ........ | 715/772 |
| 2008/0183573 A1* | 7/2008 | Muschetto | ...................... | 705/14 |

FOREIGN PATENT DOCUMENTS

JP 2003-141002 A 5/2003

\* cited by examiner

*Primary Examiner* — Barbara Burgess
(74) *Attorney, Agent, or Firm* — Birch, Stewart, Kolasch & Birch, LLP

(57) ABSTRACT

It is arranged so that the history of access to a web page that has been returned to can be determined even in a case where a "BACK" button on a browser has been clicked. Owing to a transition from one web page to another in response to clicking of hot text from the one page to the other, the URL of the destination web page is transmitted to a server. As a result, the URL of the source web page and the URL of the access destination can be recognized by the server. In a case where one web page is returned to from another web page by pressing the "BACK" button on a browser, a URL is not transmitted to the server. Therefore, a URL combination in which the source URL and the access destination URL have been interchanged is generated and stored in an access history table. Thus, even if the preceding web page is restored by pressing the "BACK" button, the server is capable of ascertaining history of the access.

4 Claims, 14 Drawing Sheets

Fig. 6

ACCESS HISTORY TABLE

| ACCESS DESTINATION URL AFTER CONVERSION | ACCESS DESTINATION URL BEFORE CONVERSION | LINK SOURCE URL | CLIENT IDENTIFICATION DATA | ACCESS TIME |
|---|---|---|---|---|
| xa.html | pagea.html | index.html | USER A | 2007:02:26:20:35:35 |
| x1.html | page1.html | pagea.html | USER A | 2007:02:26:20:36:10 |
| ..... | ..... | ..... | ..... | ..... |

ACCESS HISTORY TABLE

| REQUEST NO. | ACCESS DESTINATION URL BEFORE CONVERSION | LINK SOURCE URL | ACCESS TIME |
|---|---|---|---|
| 1 | WEB PAGE B | WEB PAGE A | 2007:06:01:10:10:00 |

ACCESS HISTORY TABLE

| REQUEST NO. | ACCESS DESTINATION URL BEFORE CONVERSION | LINK SOURCE URL | ACCESS TIME |
| --- | --- | --- | --- |
| 1 | WEB PAGE B | WEB PAGE A | 2007:06:01:10:10:00 |
| 2 | WEB PAGE C | WEB PAGE B | 2007:06:01:10:10:10 |

COMPARE

ACCESS HISTORY TABLE

| REQUEST NO. | ACCESS DESTINATION URL BEFORE CONVERSION | LINK SOURCE URL | ACCESS TIME |
|---|---|---|---|
| 1 | WEB PAGE B | WEB PAGE A | 2007:06:01:10:10:00 |
| 2 | WEB PAGE C | WEB PAGE B | 2007:06:01:10:10:10 |
| 3 | WEB PAGE D | WEB PAGE A | 2007:06:01:10:10:40 |

COMPARE

ACCESS HISTORY TABLE

| REQUEST NO. | ACCESS DESTINATION URL BEFORE CONVERSION | LINK SOURCE URL | ACCESS TIME |
|---|---|---|---|
| 1 | WEB PAGE B | WEB PAGE A | 2007:06:01:10:10:00 |
| 2 | WEB PAGE C | WEB PAGE B | 2007:06:01:10:10:10 |
| 3 | WEB PAGE B | WEB PAGE C | 2007:06:01:10:10:40 |
| 4 | WEB PAGE D | WEB PAGE A | 2007:06:01:10:10:40 |

COMPARE

*Fig. 15*

ACCESS HISTORY TABLE

| REQUEST NO. | ACCESS DESTINATION URL BEFORE CONVERSION | LINK SOURCE URL | ACCESS TIME |
|---|---|---|---|
| 1 | WEB PAGE B | WEB PAGE A | 2007:06:01:10:10:00 |
| 2 | WEB PAGE C | WEB PAGE B | 2007:06:01:10:10:10 |
| 3 | WEB PAGE B | WEB PAGE C | 2007:06:01:10:10:40 |
| 4 | WEB PAGE A | WEB PAGE B | 2007:06:01:10:10:40 |
| 5 | WEB PAGE D | WEB PAGE A | 2007:06:01:10:10:40 |

COMPARE

SERVER SYSTEM, METHOD OF CONTROLLING OPERATION THEREOF AND CONTROL PROGRAM THEREFOR

BACKGROUND OF THE INVENTION

1. Field of the Invention

This invention relates to a server system, a method of controlling operation of this server system, and a program for controlling the system.

2. Description of the Related Art

There are instances where the access log of a web server is analyzed in order to raise the number of accesses to a web page. When data representing the URL of a web page to be accessed is transmitted to a web server and the web page is accessed, a record of the access remains as an access log.

However, in a case where the web page preceding the web page being accessed is accessed by clicking a button such as the "BACK" button of a browser, there are instances where the data of the web page that has been stored in a cache memory of the client terminal device is read out and displayed without the web server being transmitted data indicating the URL of the web page to be accessed. Consequently, even though the preceding web page has been displayed on the client terminal device, a record of access to the web page displayed as by clicking the "BACK" button may not remain in the access log.

Further, in the case of a mobile telephone, the length of the URLs that can be handled is limited. For this reason, a technique that enables a web page to be accessed irrespective of such a limitation has been proposed (see the specification of Japanese Patent Application Laid-Open No. 2003-141002).

Even with this technique, however, a history of access to a web page that was displayed by clicking a "BACK" button will not remain in an access log.

SUMMARY OF THE INVENTION

Accordingly, an object of the present invention is to so arrange it that a history of access to a web page restored as by a "BACK" button will remain in an access log.

According to the present invention, the foregoing object is attained by providing a server system for receiving request data, which is transmitted from a client terminal device, for a web page specified by a URL, and transmitting the data of the web page requested by the received request data to the client terminal device, the system comprising: an access history storage device for storing the URL of the web page, which is represented by the web page data that has been transmitted to the client terminal device in response to the request, in an access history table as an access destination URL, and storing the URL of a web page, which was being displayed on a display unit of the client terminal device when the request data was transmitted, in the access history table as a link source URL, the URLs being stored in the table in accordance with an order in which requests were made; a determination device for determining whether there is a non-match between a link source URL based upon a current request and an access destination URL based upon an immediately preceding request; and a history revising device, responsive to a determination by the determination device that there is a non-match between the URLs, for executing processing whereby a URL combination, in which a link source URL and an access destination URL that were stored in the access history table by a request previous to the immediately preceding request have been interchanged, is inserted in the access history table as a request between the current request and the immediately preceding request in reverse chronological order of requests previous to the immediately preceding request, this processing being executed repeatedly until the access destination URL of the inserted request and the link source URL of the current request match.

The present invention also provides an operation control method suited to the above-described server system. Specifically, the present invention provides a method of controlling operation of a server system for receiving request data, which is transmitted from a client terminal device, for a web page specified by a URL, and transmitting the data of the web page requested by the received request data to the client terminal device, the method comprising: a step of an access history storage device storing the URL of the web page, which is represented by the web page data that has been transmitted to the client terminal device in response to the request, in an access history table as an access destination URL, and storing the URL of a web page, which was being displayed on a display unit of the terminal device when the request data was transmitted, in the access history table as a link source URL, the URLs being stored in the table in accordance with an order in which requests were made; a step of a determination device determining whether there is a non-match between a link source URL based upon a current request and an access destination URL based upon an immediately preceding request; and in response to a determination by the determination device that there is a non-match between the URLs, a step of a history revising device executing processing whereby a URL combination, in which a link source URL and an access destination URL that were stored in the access history table by a request previous to the immediately preceding request have been interchanged, is inserted in the access history table as a request between the current request and the immediately preceding request in reverse chronological order of requests previous to the immediately preceding request, this processing being executed repeatedly until the access destination URL of the inserted request and the link source URL of the current request match.

The present invention also provides a program for controlling the above-described server system. Further, it may be so arranged that a recording medium storing this program is provided.

In accordance with the present invention, the URL of a web page represented by web page data that has been transmitted to a client terminal device in response to a request from the client terminal device is stored in an access history table as an access destination URL that was accessed by the client terminal device, and the URL of a web page that was being displayed on the display unit of the client terminal device when the request was made is stored in the access history table as a link source URL, these URLs being stored in the table in accordance with the order in which requests were made. It is determined whether there is a non-match between a link source URL based upon a current request and an access destination URL based upon an immediately preceding request. If the URLs match, then the history of access from the web page of the immediately preceding access destination URL to the web page of the current access destination URL remains in the access history table. If the URLs do not match, then the history of access from the web page of the immediately preceding access destination URL to the web page of the current access destination URL does not remain in the access history table. Therefore, a history revising device executes processing whereby a URL combination, in which a link source URL and an access destination URL that were stored in the access history table by a request previous to the immediately preceding request have been interchanged, is inserted in the access history table as a request between the current request and the immediately preceding request in reverse chronological order of requests previous to the immediately preceding request. This processing is executed repeatedly until the access destination URL of the inserted request and the link source URL of the current request match. Thus, even in a case where the client terminal device is returned to the immediately preceding web page through use of a "BACK" button on a browser or the like and does not transmit data indicating the URL of the accessed web page to the server system, the history of access is stored in the access history table.

In a case where a client terminal device has not been assigned a unique IP (Internet Protocol) address, as in the case of a mobile telephone, the server system according to the present invention preferably is applied to a proxy server having the configuration set forth below. Specifically, a proxy server constituting a communication system having a client terminal device, the proxy server and a web server comprises: a determination device for determining whether a URL of a web page requested from the client terminal device is not one that has been converted in the proxy server; an identification data generating device for generating identification data of the client terminal device in response to a determination by the determination device that the URL of the requested web page has not been converted in the proxy server; a first request device for issuing a request from the client terminal device for a web page to the web server in response to a determination by the determination device that the URL of the requested web page has not been converted in the proxy server; a URL reverse-converting device for restoring a converted URL to the URL that prevailed before the conversion, in response to a determination by the determination device that the URL of the requested web page has been converted in the proxy server; a second request device for issuing a request for a web page specified by the URL restored by the URL reverse-converting device to the web server; a link destination URL converting device for converting a link destination URL that indicates a link destination of a web page, the link destination URL being included in the web page represented by the web page data that has been transmitted from the web server in response to the request from the first request device or the second request device; a web page data transmitting device for transmitting web page data, which represents the web page containing the link destination URL that has been converted by the link destination converting device, to the client terminal device; and a storage control device for controlling a storage device in such a manner that the identification data generated by the identification data generating device and the URL before conversion by the link destination converting device are stored in correspondence with each other.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

FIG. 6 illustrates an example of an access history table;

FIGS. 11A to 14A illustrate transitions of display of web pages and FIGS. 11B to 14B illustrates access history tables;

FIG. 15 illustrates an access history table; and

DESCRIPTION OF THE PREFERRED EMBODIMENT

A preferred embodiment of the present invention will be described in detail with reference to the drawings.

Figure 1:
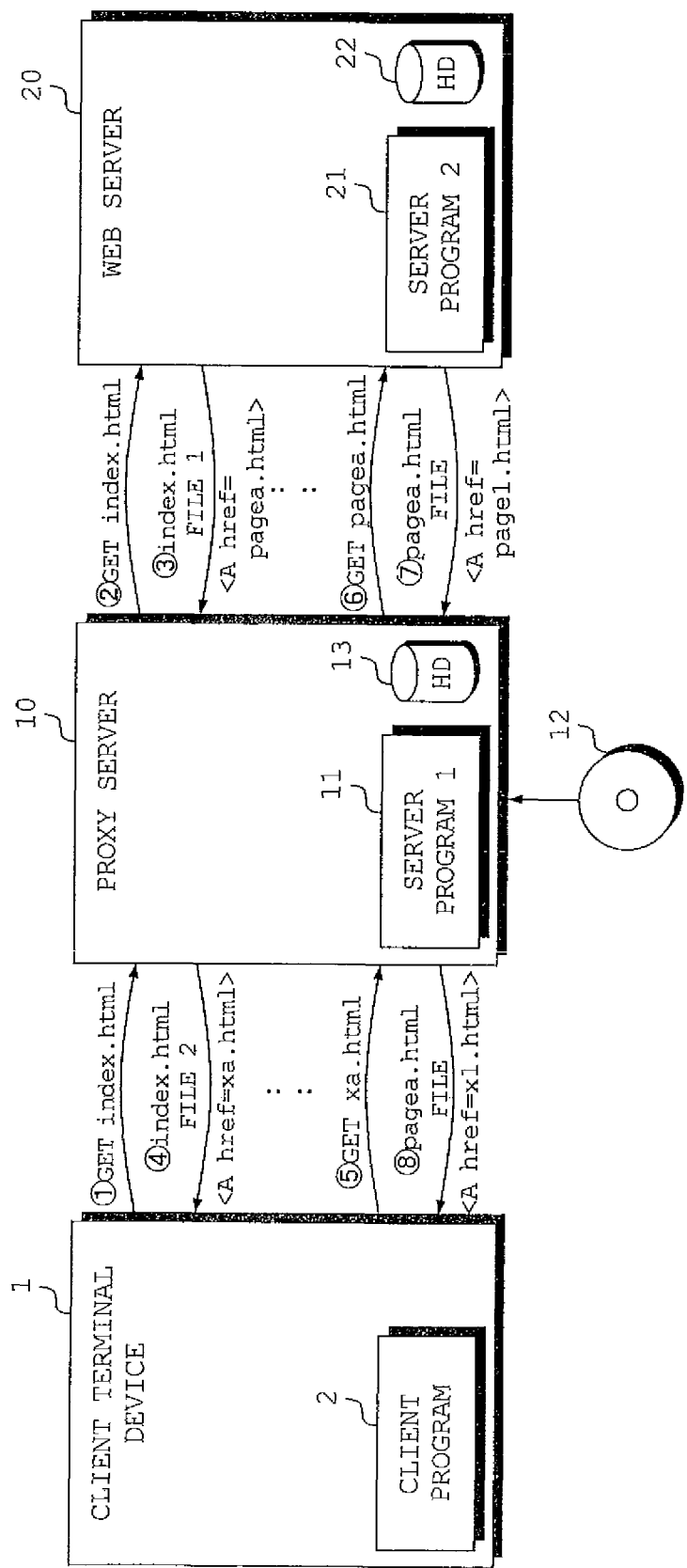
FIG. 1 illustrates the overall configuration of a communication system.

FIG. 1 is a block diagram illustrating the overall configuration of a communication system according to an embodiment of the present invention.

The communication system according to this embodiment includes a client terminal device 1 typified by a mobile telephone (although it goes without saying that the device is not limited to a mobile telephone), a proxy server 10 and a web server 20.

A client program 2 for controlling operation, described later, has been installed in the client terminal device 1. The client terminal device 1 includes a CPU, a display unit for displaying a web page, a communication unit for communicating with the proxy server 10, a keypad for applying various commands and a memory, etc., although none of these are illustrated.

A first server program 11 for controlling operation, described later, has been installed in the proxy server 10. The first server program 11, which has been stored on a CD-ROM (compact-disk-read-only memory), is read by a CD-ROM drive (not shown) and installed in the proxy server 10. Naturally, it may be so arranged that the server program 11 transmitted from another server or the like is received and installed in the proxy server 10. The proxy server 10 further includes a hard disk 13 for storing an access history table, described later, and other data.

A second server program 21 for controlling operation, described later, has been installed in the web server 20. The web server 20 further includes a hard disk 22. Data such as data of a web page displayed on the display unit of the client terminal device 1 has been stored on the hard disk 22.

Both the proxy server 10 and the web server 20 also include a CPU, a display unit, a communication unit, a memory, a hard disk drive and a keyboard, etc.

When a web page represented by desired web page data that has been stored in the web server 20 is displayed on the display unit of the client terminal device 1, the client terminal device 1 and the proxy server 10 are connected and the proxy server 10 and the web server 20 are connected.

Figure 2:
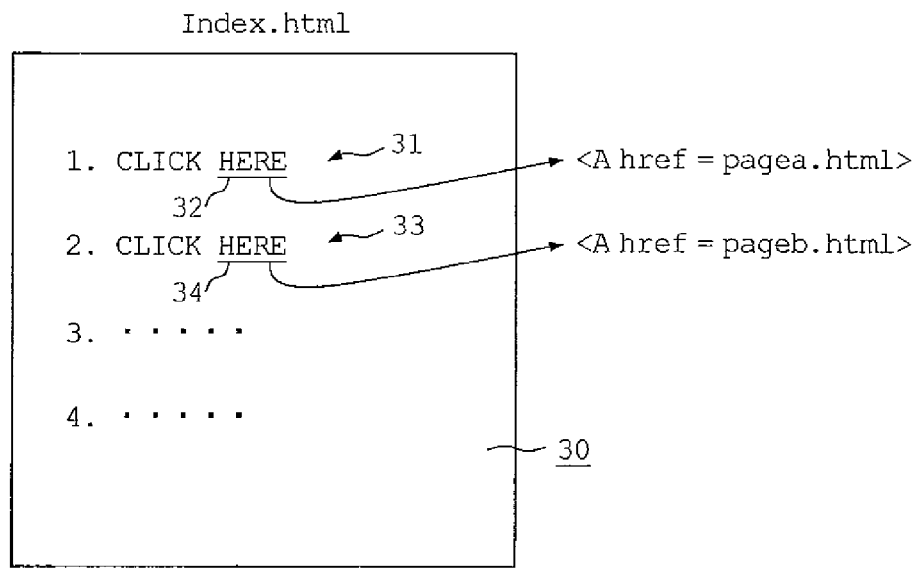
FIGS. 2 and 3 illustrate examples of web pages in which link destination URLs have been embedded.

FIG. 2 illustrates an example of a web page 30 having the URL "index.html".

A web page 30 having the URL "index.html" contains a first character string 31 reading "CLICK HERE" and a second character string 33 reading "CLICK HERE". The character string "HERE" in the first character string 31 is clickable and constitutes hot text 32. The hot text 32 is linked to a web page having a URL "pagea.html". The character string "HERE" in the second character string 33 is clickable and constitutes hot text 34. The hot text 34 is linked to a web page having a URL "pageb.html".

Figure 3:
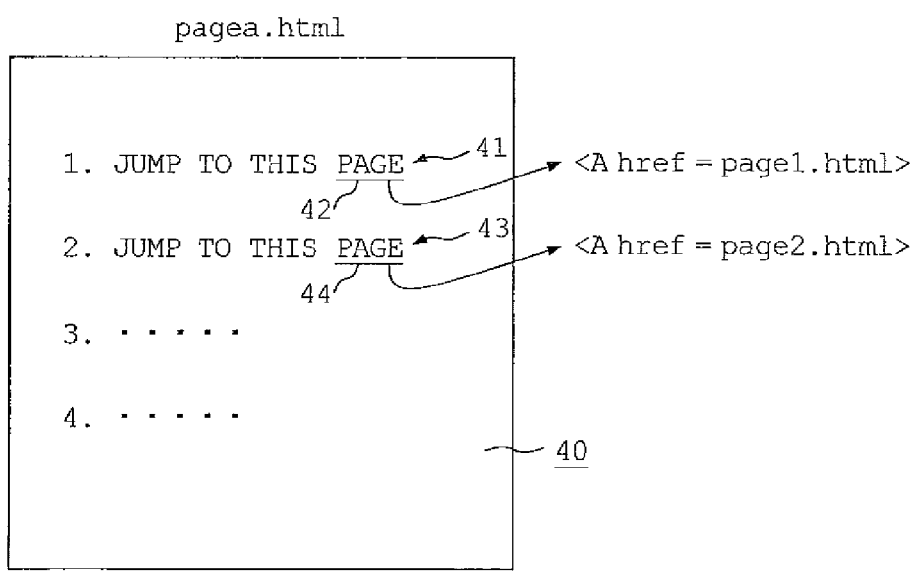

FIG. 3 illustrates an example of the web page having the URL "pagea.html".

Web page 40 having the URL "pagea.html" contains a first character string 41 reading "JUMP TO THIS PAGE" and a second character string 43 reading "JUMP TO THIS PAGE". The character string "PAGE" in the first character string 41 is hot text 42. The hot text 42 is linked to a web page having a URL "page1.html". The character string "PAGE" in the second character string 43 is hot text 44. The hot text 44 is linked to a web page having a URL "page2.html".

If the hot text 32 is clicked in a case where the web page 30 having the URL "index.html" shown in FIG. 2 is being displayed, the web page 40 having the URL "pagea.html", which is the link destination of the hot text 32, is displayed.

Figure 4:
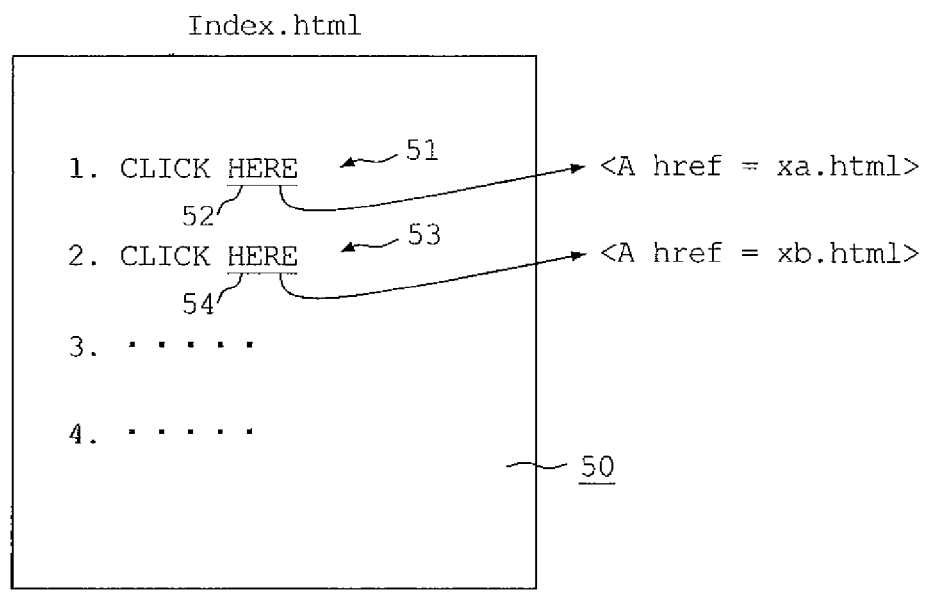
FIGS. 4 and 5 illustrate examples of web pages in which converted link destination URLs have been embedded.

In this embodiment, a web page 50 shown in FIG. 4 is displayed on the client terminal device 1 if the web page 30 shown in FIG. 2 is requested at the client terminal device 1.

FIG. 4 illustrates an example of the web page 50 having the URL "index.html".

In a manner similar to the web page 30 shown in FIG. 2, the web page 50 contains a first character string 51 reading "CLICK HERE" and a second character string 53 reading "CLICK HERE". The character string "HERE" in the first character string 51 is clickable and constitutes hot text 52. The hot text 52 is linked to a web page having a URL "xa.html", which is different from the web page having the URL "pagea.html" that is the link destination of the hot text 32 shown in FIG. 2. The character string "HERE" in the second character string 53 is clickable and constitutes hot text 54. The hot text 54 is linked to a web page having a URL "xb.html", which is different from the web page having the URL "pageb.html" that is the link destination of the hot text 34 shown in FIG. 2.

In this embodiment of the present invention, as shown in FIG. 1, if the client terminal device 1 requests the web page having the URL "index.html" shown in FIG. 2, then the client terminal device 1 sends the proxy server 10 a request "GET index.html". If the URL (index.html) contained in the request has not been converted in the proxy server 10, then the request "GET index.html" is transmitted from the proxy server 10 to the web server 20. In accordance with this request, the web server 20 transmits web page data (index.html file 1), which is for displaying the web page having the URL "index.html" shown in FIG. 2, to the proxy server 10. The URLs which are the link destinations of the hot text are converted in the proxy server 10 in such a manner that the data representing the web page 50 shown in FIG. 4 is obtained from the web page 30 shown in FIG. 2. More specifically, the link destination is converted from "pagea.html" shown in FIG. 2 to "xa.html" shown in FIG. 4, and from "pageb.html" shown in FIG. 2 to "xb.html" shown in FIG. 4. Web page data (index.html file 2), in which the URLs of the link destinations have been converted, is transmitted from the proxy server 10 to the client terminal device 1.

When the web page 50 shown in FIG. 4 is displayed on the display unit of the client terminal device 1, the user of the client terminal device 1 clicks either of the hot text items being displayed on the web page 50. If the hot text 52 is clicked by the user, then the request "GET xa.html" for the web page of "xa.html", which is the link destination of the hot text 52, is sent from the client terminal device 1 to the proxy server 10.

When the request "GET xa.html" for the web page having the URL "xa.html" is received by the proxy server 10, the URL (xa.html) of the requested web page, since it was converted by the proxy server 10, is restored to the original URL (pagea.html) that prevailed before the conversion. The request "GET pagea.html" for the web page having the restored original URL (pagea.html) is transmitted from the proxy server 10 to the web server 20.

When the request "GET pagea.html" for the web page having the URL "pagea.html" transmitted from the proxy server 10 is received by the web server 20, the latter responds to the request by sending the proxy server 10 the web page data (page.html file) representing the web page having the URL "pagea.html", as illustrated in FIG. 3.

Figure 5:
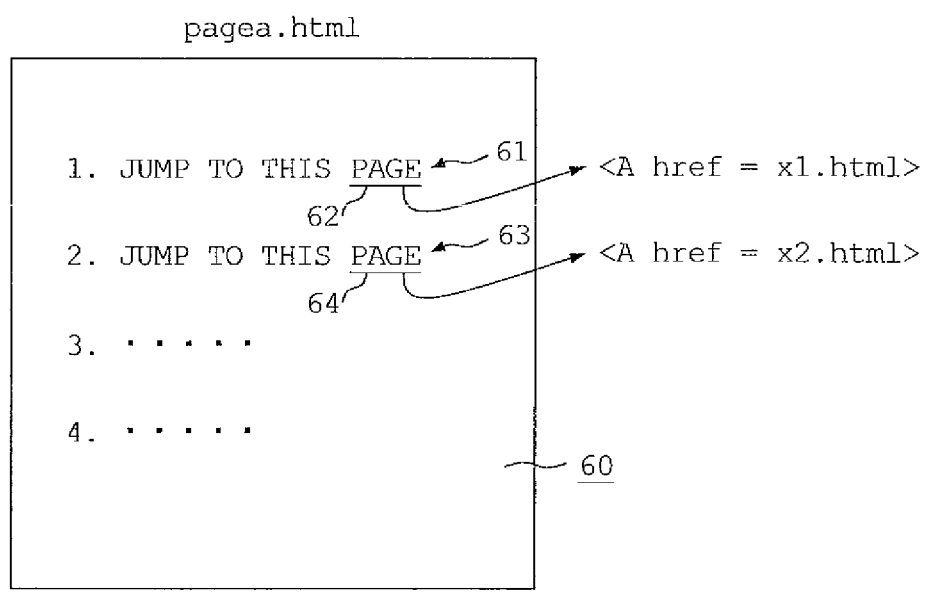

Processing for URL conversion is executed in the proxy server 10 in such a manner that a web page 60 shown in FIG. 5 is displayed from the web page 40 shown in FIG. 3.

In a manner similar to FIG. 3, the web page 60 having the URL "pagea.html" contains a first character string 61 reading "JUMP TO THIS PAGE" and a second character string 63 reading "JUMP TO THIS PAGE". The character string "PAGE" in the first character string 61 is hot text 62. The hot text 62 is linked to a web page having a URL "x1.html" and not to the web page having the URL "page1.html" as in the case of the hot text 52 shown in FIG. 3. The character string "PAGE" in the second character string 63 is hot text 64. The hot text 64 is linked to a web page having a URL "x2.html" and not to the web page having the URL "page2.html" as in the case of the hot text 44 shown in FIG. 3.

Conversion of the link destination URLs contained in the web page is performed by the proxy server 10 in such a manner that the web page 60 shown in FIG. 5 is displayed from the web page 40 shown in FIG. 3. By transmitting the web page data (pagea.html file) in which the link destination URLs have been converted from the proxy server 10 to the client terminal device 1, the web page 60 shown in FIG. 5 is displayed on the display screen of the display unit of client terminal device 1. Thereafter, in a manner similar to that described above, the URL of the web page requested from the client terminal device 1 is reverse-converted by the proxy server 10 and the request for the web page having the URL that prevailed before the conversion is applied to the web server 20, as a result of which the web server 20 transmits the web page data to the client terminal device 1 via the proxy server 10.

FIG. 6 illustrates an example of an access history table.

The access history table is stored on the hard disk 13 of the proxy server 10.

Recorded in the access history table are access destination URLs after conversion, access destination URLs before conversion, link source URLs, client identification data and access times. The link source URLs are the URLs of the web pages 30 to 60 to which the link destinations have been affixed by the hot text 32, 34, 42, 44, 52, 54, 62 and 64, as illustrated in FIGS. 2 to 5. The client identification data is generated in order to identify the client terminal device 1 in a case where the URL of a web page requested from the client terminal device 1 has not been converted in the proxy server 10, i.e., in a case where a request is issued from the client terminal device 1 to the proxy server 10 initially. As for access times, if reverse conversion of a URL has been performed, the access time is recorded as an indication of access to the web page having the reverse-converted URL.

Which web page has been accessed by the client terminal device identified by the client identification data can be determined from the history of the link source URLs in the access history table.

Figure 7:
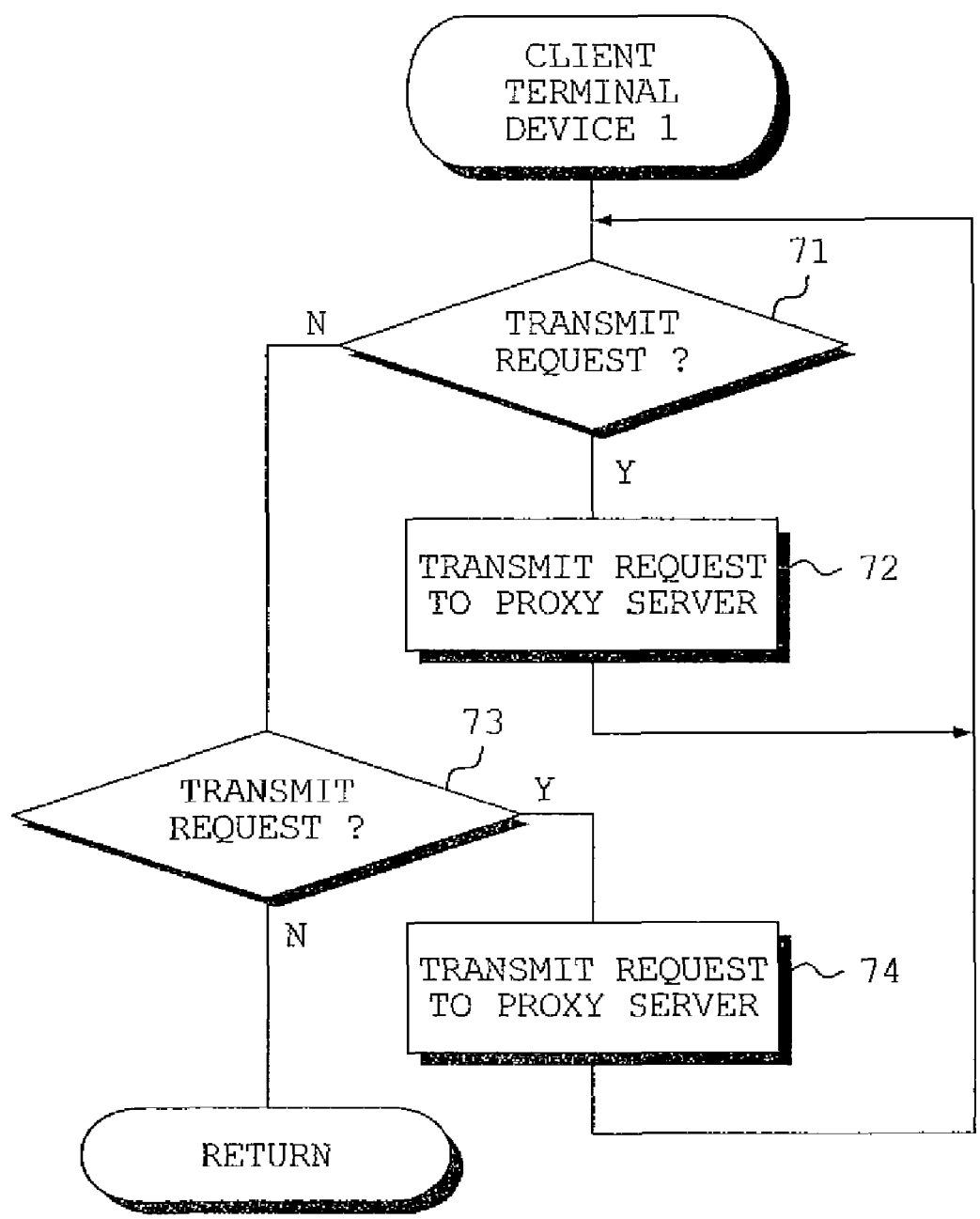
FIG. 7 is a flowchart illustrating processing executed by a client terminal device.
Figure 8:
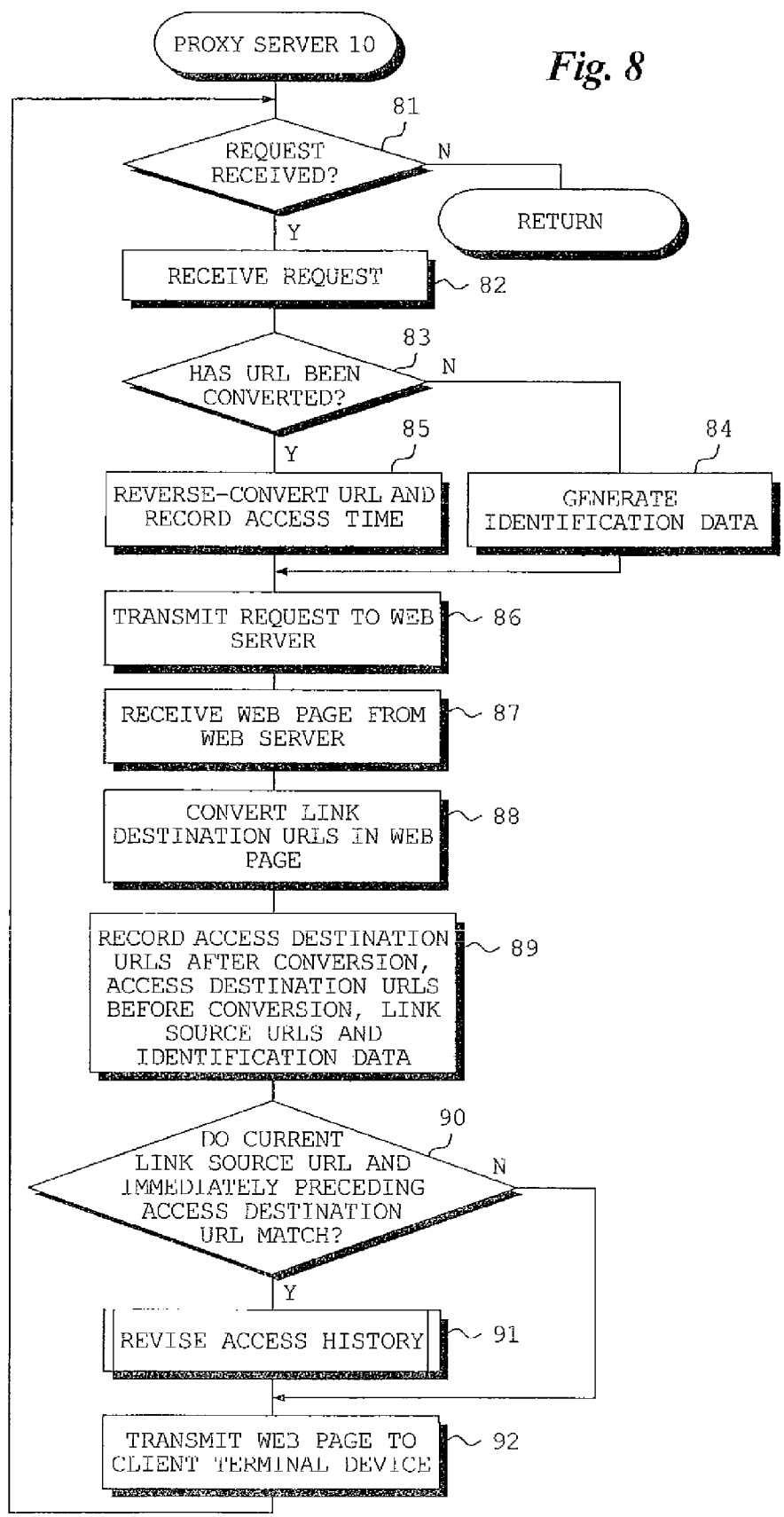
FIG. 8 is a flowchart illustrating processing executed by a proxy server.
Figure 9:
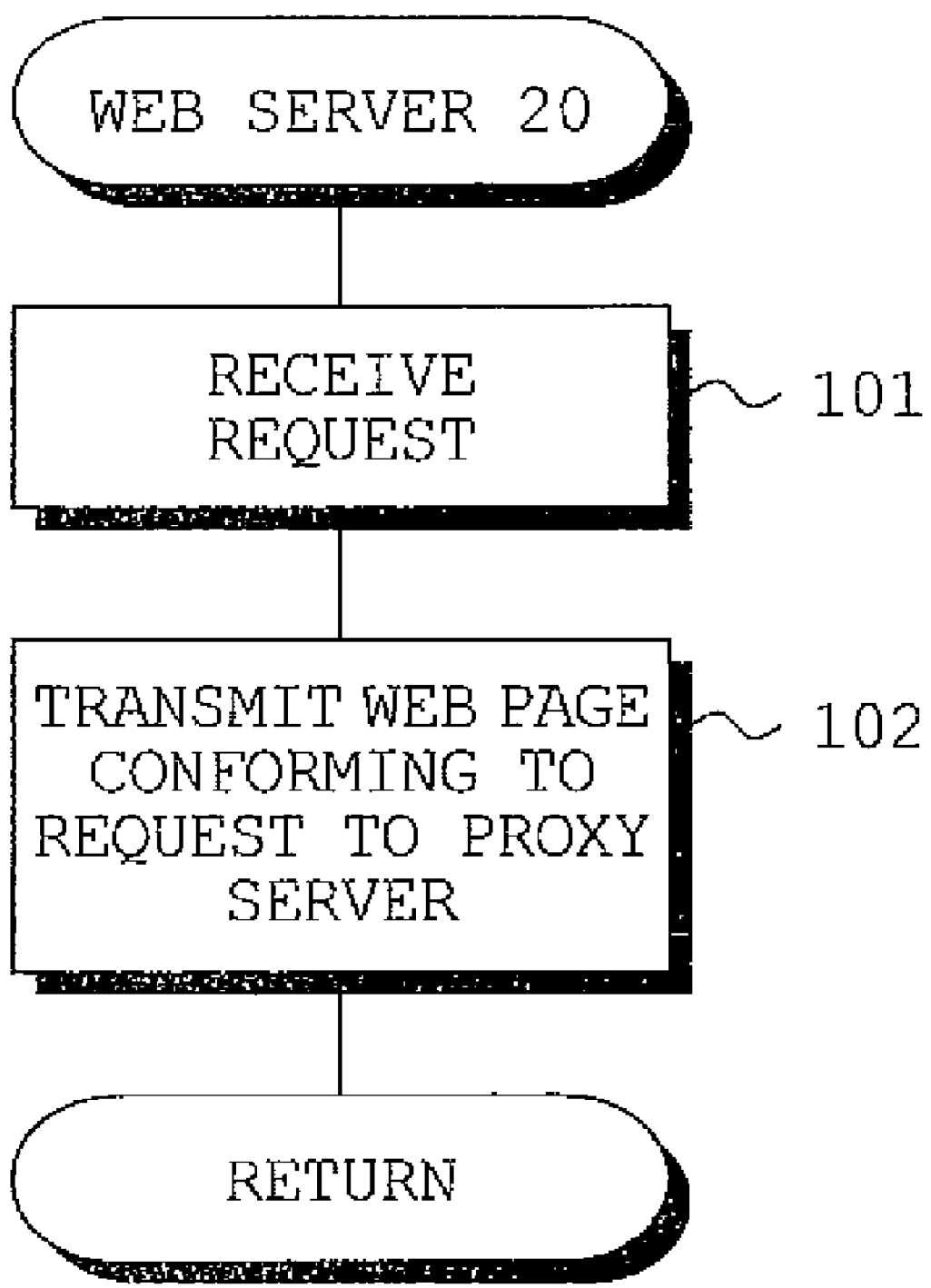
FIG. 9 is a flowchart illustrating processing executed by a web server.

FIGS. 7 to 9 are flowcharts illustrating processing executed among the client terminal device 1, proxy server 10 and web server 20. FIG. 7 illustrates the processing executed by the client terminal device 1, FIG. 8 the processing executed by the proxy server 10 and FIG. 9 the processing executed by the web server 20.

If a web page is displayed anew on the display unit of the client terminal device 1, then the client terminal device 1 sends the proxy server 10 a request for a web page specified by the URL of the web page ("YES" at step 71 in FIG. 7; step 72 in FIG. 7). If, in response to clicking of a "BACK" button on the browser of the client terminal device 1, the client terminal device 1 accesses the web page that was displayed before the web page currently being displayed ("YES" at step 73 in FIG. 7), then the web page data that has been stored in the cache memory of the client terminal device 1 is read out and the web page represented by the this read-out web page data is displayed on the display unit of the client terminal device 1 (step 74 in FIG. 7).

When the request transmitted from the client terminal device 1 is received by the proxy server 10 (steps 81 and 82 in FIG. 8), it is determined whether the URL of the web page specified by the received request is one that has been converted in the proxy server 10 (step 83 in FIG. 8).

If the request for the web page has been transmitted to the proxy server 10 for the first time, then the URL of the web page specified by this request is one that has not been converted in the proxy server 10 ("NO" at step 83 in FIG. 8). Therefore, identification data specific to the client terminal device 1 that transmitted the request is generated by the proxy server 10 (step 84 in FIG. 8). The request received is transmitted from the proxy server 10 to the web server 20 (step 86 in FIG. 8).

The request transmitted from the proxy server 10 is received by the web server 20 (step 101 in FIG. 9), whereupon data representing the web page having the URL specified by this request is transmitted from the web server 20 to the proxy server 10 (step 102 in FIG. 9).

When the web page data transmitted from the web server 20 is received by the proxy server 10 (step 87 in FIG. 8), the link destination URLs that have been embedded in the hot text contained in the web page represented by the received web page data are converted (step 88 in FIG. 8). The access destination URLs after the conversion, the access destination URLs before the conversion, the link source URLs (the URLs of the web pages) and the identification data are recorded in the access history table (step 89 in FIG. 8).

If, in response to clicking of a "BACK" button on the browser of the client terminal device 1, the client terminal device 1 accesses the web page that was displayed before the web page currently being displayed, then the web page data that has been stored in the cache memory of the client terminal device 1 is read out and the web page represented by the this read-out web page data is displayed on the display unit of the client terminal device 1, as mentioned earlier. In a case where web page data that has been stored in the cache memory of the client terminal device 1 is read out and the web page represented by the read-out web page data is displayed on the display unit of the client terminal device 1, a request for the web page is not transmitted from the client terminal device 1 to the proxy server 10. Therefore, even though the immediately preceding web page has been displayed on the display unit of the client terminal device 1 by clicking the "BACK" button, the fact that the client terminal device 1 accessed this immediately preceding web page cannot be recognized by the proxy server 10. Consequently, in a case where a request for a web page is newly transmitted to the proxy server 10 after the immediately preceding web page has been restored by the "BACK" button, the current link destination URL newly requested and the access destination URL that is based upon the immediately preceding request will not match ("NO" at step 90 in FIG. 8). In this embodiment, even if the immediately preceding web page is accessed by clicking the "BACK" button of the browser, the access history is revised in such a manner that it can be determined that the immediately preceding web page was accessed (step 91 in FIG. 8). Revision of the access history will be described later in greater detail.

The web page data in which the access destination URLs have been converted is transmitted from the proxy server 10 to the client terminal device 1 (step 92 in FIG. 8).

When the web page data transmitted from the proxy server 10 is received by the client terminal device 1, hot text contained in the web page represented by the received web page data is clicked. When this is done, a request for the web page having the access destination URL embedded in this hot text is transmitted from the client terminal device 1 to the proxy server 10 ("YES" at step 71 in FIG. 7; step 72 in FIG. 7).

When the request transmitted from the client terminal device 1 is received by the proxy server 10 (steps 81, 82 in FIG. 8), it is determined whether the URL specified by this request is a URL that has been converted (step 83). In this case, the URL is one that has been converted ("YES" at step 83 in FIG. 8) and therefore the URL is restored to the URL before the conversion by referring to the access history table (step 85 in FIG. 8). Further, the access time is recorded in the access history table (step 85 in FIG. 8). The request for the web page specified by the reverse-converted URL is transmitted from the proxy server 10 to the web server 20 (step 86 in FIG. 8), whereby data representing the web page having the reverse-converted URL is transmitted from the web server 20 to the proxy server 10 (step 72 in FIG. 7). Access destination URLs that have been embedded in the web page are converted in the proxy server 10 (step 88 in FIG. 8). The converted link destination URLs, etc., are recorded in the access history table (step 89 in FIG. 8). The web page data in which the access destination URLs have been converted is transmitted from the proxy server 10 to the client terminal device 1 (step 90 in FIG. 8). Processing is subsequently repeated in similar fashion when a request is sent from the client terminal device 1 to the proxy server 10.

FIGS. 10 to 16 illustrate processing for revising access history in a case where an immediately preceding web page is accessed from a currently displayed web page by utilizing the "BACK" button on the browser of the client terminal device 1 as mentioned above.

Figure 10:
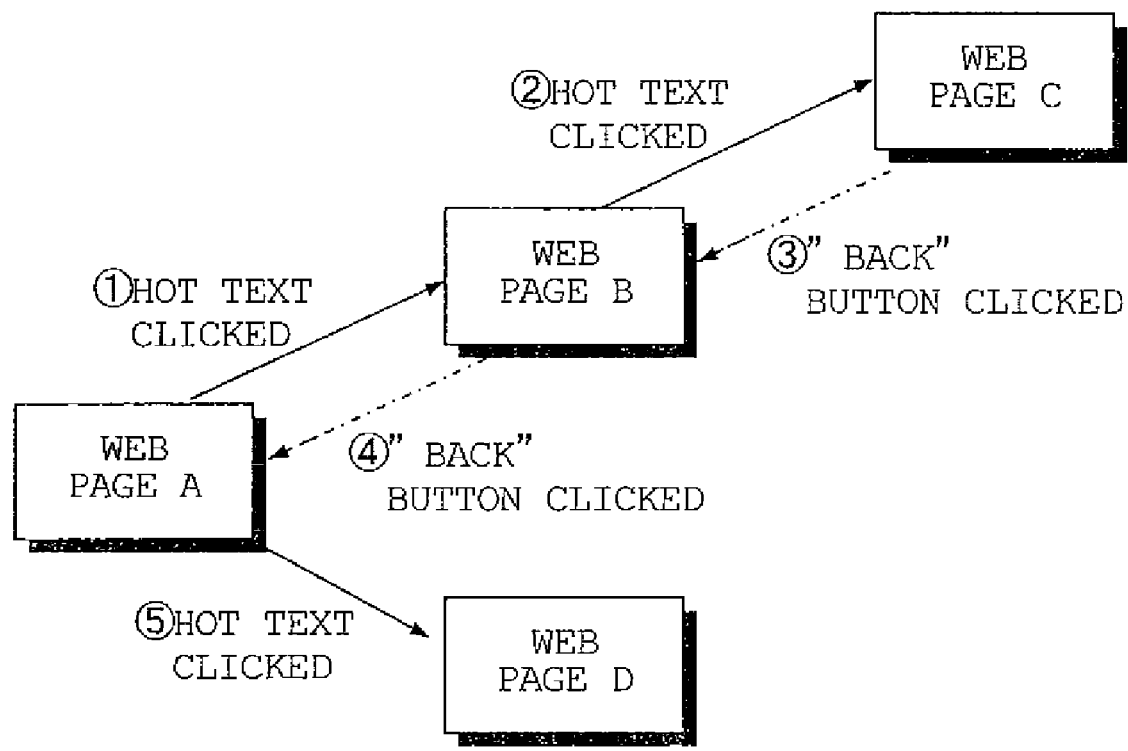
FIG. 10 illustrates a transition of display of web pages.

FIG. 10 illustrates a transition of display of web pages.

Assume that a web page A is initially being displayed on the display unit of the client terminal device 1. By clicking hot text which is contained in web page A and linked to a web page B, the display undergoes a transition from web page A to web page B. By further clicking hot text which is contained in web page B, a web page C is displayed. If a "BACK" button on the browser is clicked when web page C is being displayed, web page B, which was being displayed before web page C, is displayed. If the "BACK" button on the browser is clicked when web page B is being displayed, web page A, which was being displayed before web page B, is displayed. By clicking hot text which is contained in web page A and linked to a web page D, web page D is displayed. Revision of the access history table in such a transition of the display of web pages will now be described.

Figures 11A, 11B:
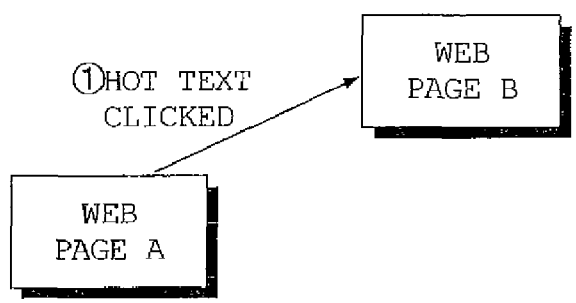

FIG. 11A illustrates the manner in which the display changes over from web page A to web page B in response to clicking of the hot text contained in web page A. FIG. 11B illustrates an example of the access history table generated in the case of the transition shown in FIG. 11A. The access history table illustrated here differs from that of FIG. 6 in that the destination URLs after conversion and the client identification data are omitted. Further, request numbers have been added in order to facilitate understanding.

In a case where web page B is accessed from web page A by clicking the hot text contained in web page A, as illustrated in FIG. 11A, the URL of web page B is transmitted from the client terminal device 1 to the proxy server 10. Therefore, as illustrated in FIG. 11B, the URL of web page A, which is the link source URL, is stored in the access history table in correspondence with Request No. 1 as the initial request, and the URL of web page B, which is the access destination URL (the access destination URL before conversion), is also stored in the table in correspondence with Request No. 1. The access time is also stored in the access history table as described earlier.

Figures 12A, 12B:
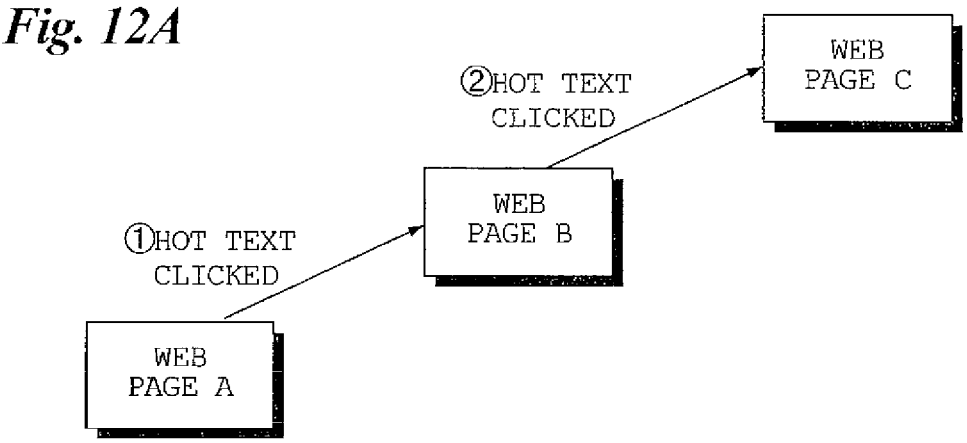

FIG. 12A illustrates the manner in which the display changes over from web page B to web page C in response to clicking of the hot text contained in web page B. FIG. 12B illustrates an example of the access history table generated in the case of the transition shown in FIG. 12A.

In a case where web page C is accessed from web page B by clicking the hot text contained in web page B, as illustrated in FIG. 12A, the URL of web page C is transmitted from the client terminal device 1 to the proxy server 10. Therefore, as illustrated in FIG. 12B, the URL of web page B, which is the link source URL, is stored in the access history table in correspondence with Request No. 2 as the second request, and the URL of web page C, which is the access destination URL, is also stored in the table in correspondence with Request No. 2.

The link source URL (web page B) that has been stored in correspondence with Request No. 2, which is the last request (the current request) in the access history table shown in FIG. 12B, is compared with the access destination URL (web page B) that has been stored in correspondence with Request No. 1, which is the request that is second from the last (i.e., the immediately preceding request). If the result of the comparison is a match, it is construed that the "BACK" button has not been clicked and that the access history has been stored in the access history table by transmitting a request from the client terminal device 1 to the proxy server 10. Therefore, no revision of the access history is carried out.

Figures 13A, 13B:
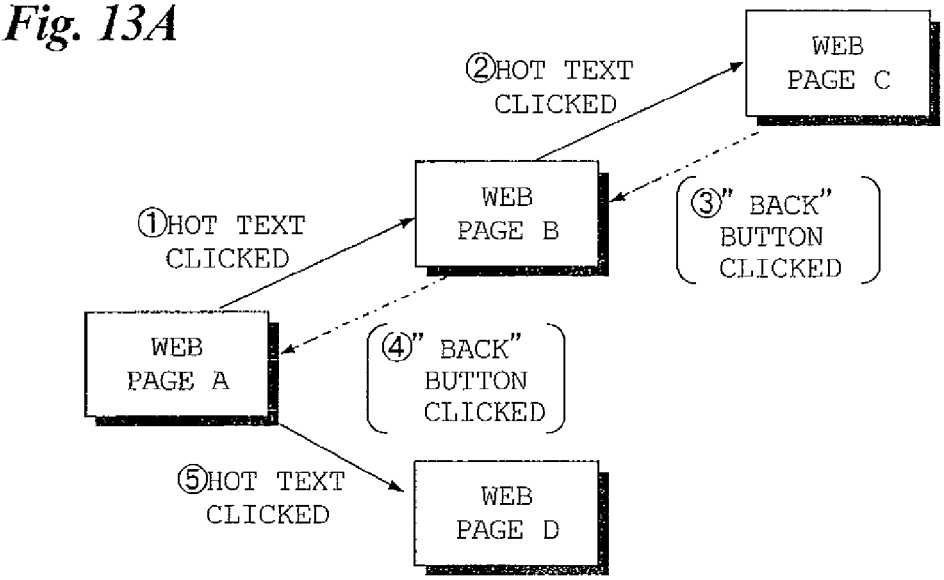

In a manner similar to FIG. 10, FIG. 13A illustrates the manner in which web page B preceding web page C is displayed by clicking the "BACK" button when web page C is being displayed and in which web page A preceding web page B is displayed by clicking the "BACK" button further, after which web page D is displayed by clicking the hot text in web page A. FIG. 13B illustrates an example of the access history table before revision of the access history generated in the case of the transition shown in FIG. 13A.

As described earlier, in a case where the "BACK" button of the browser has been clicked, a web page URL is not transmitted from the client terminal device 1 to the proxy server 10. Therefore, even though the "BACK" button is clicked in the case where web page C is being displayed, and even though the "BACK" button is clicked in the case where web page B is being displayed, the access history table does not change. In the case where web page D is accessed from web page A by clicking the hot text contained in web page A, the URL of web page D is transmitted from the client terminal device 1 to the proxy server 10. As illustrated in FIG. 13B, therefore, web page A, which is the link source URL, is stored in the access history table in correspondence with Request No. 3, and web page D, which is the access destination URL, also is stored in the table in correspondence with Request No. 3.

As illustrated in FIG. 13B, information regarding the URLs transmitted to the proxy server 10 by clicking the items of hot text in the manner shown in FIG. 13A is stored in the access history table first.

The link source URL (web page A) that has been stored in correspondence with Request No. 3, which is the last request (the current request) in the access history table shown in FIG. 13B, is compared with the access destination URL (web page C) that has been stored in correspondence with Request No. 2, which is the request that is second from the last (i.e., the immediately preceding request). If the result of the comparison is a non-match, this means that the display was changed over by clicking the "BACK" button. Consequently, this means that the actual access history at client terminal device 1 is different from the access history that has been stored in the access history table stored in the proxy server 10. Hence, the access history table is revised.

Figures 14A, 14B:
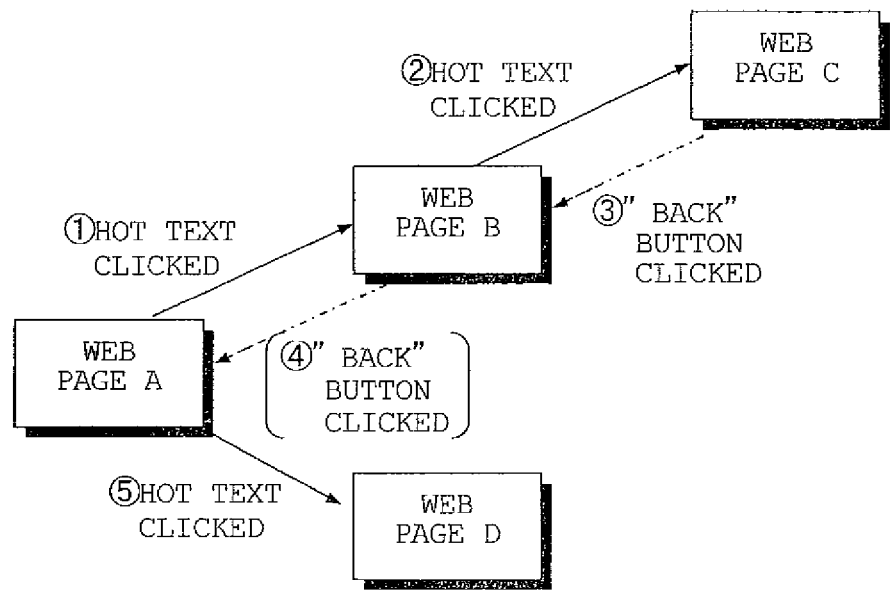

In a manner similar to FIG. 10, FIG. 14A also illustrates the manner in which web page B preceding web page C is displayed by clicking the "BACK" button when web page C is being displayed and in which web page A preceding web page B is displayed by clicking the "BACK" button further, after which web page D is displayed by clicking the hot text in web page A. FIG. 14B illustrates an example of the access history table after revision of the access history when web page B was restored from web page C in the case of the transition shown in FIG. 14A.

As illustrated in FIG. 13B, if the link destination URL that has been stored in correspondence with the last request (the current request) and the access destination URL that has been stored in correspondence with the request (immediately preceding request) preceding the last request do not match, then, as illustrated in FIG. 14B, a request in which the link source URL and the access destination URL that have been stored in correspondence with the immediately preceding request are interchanged is generated and this request is stored between the last request and the request immediately preceding the last request. That is, the link source URL of the request that precedes the last request shown in FIG. 13B is that of web page B, and the access destination URL of this request is that of web page C. Accordingly, a request composed of a combination of URLs, in which the link source URL is now that of web page C and the access destination URL is now that of web page B, is generated and is inserted in the access history table as a request immediately preceding the last request, as illustrated in FIG. 14B. As a result, the access history of client terminal device 1 in the case where web page B was restored from web page C by clicking the "BACK" button is inserted into the access history table in FIG. 14A. By storing the URL combination, in which the link source URL and the access destination URL have been interchanged, in the access history table, it can be understood that an access history of web pages resulting from clicking of the "BACK" button has been generated. Further, it goes without saying that the request numbers in the access history table are also updated. Furthermore, the access time of the inserted request becomes the access time of the last request.

In FIG. 14B, the link source URL of the last request and the access destination URL of the request that precedes the last request are compared. If they do not match, the access history table is revised further. Specifically, a request is generated and is composed of a URL combination in which there has been an interchange of the access destination URL and link source URL of the request (Request No. 1) that precedes the request (Request No. 2) in which the access destination URL and link source URL were interchanged, and this generated request is inserted between the last request and the request immediately preceding the last request. The access destination URL of Request No. 1 is that of web page B, and the link source URL of this request is that of web page A. Accordingly, a request in which the access destination URL is that of web page A and the link source URL is that of web page B is stored between the last request and the request immediately preceding the last request (see FIG. 15). As a result, the access history in the case where web page A was restored from web page B by clicking the "BACK" button is added to the access history table in FIG. 14A.

With reference to FIG. 15, since the link source URL of the last request and the access destination URL of the request immediately preceding the last request match, processing for revising access history ends. As a result, an access history corresponding to the web-page display transition depicted in FIG. 10 is obtained.

Figure 16:
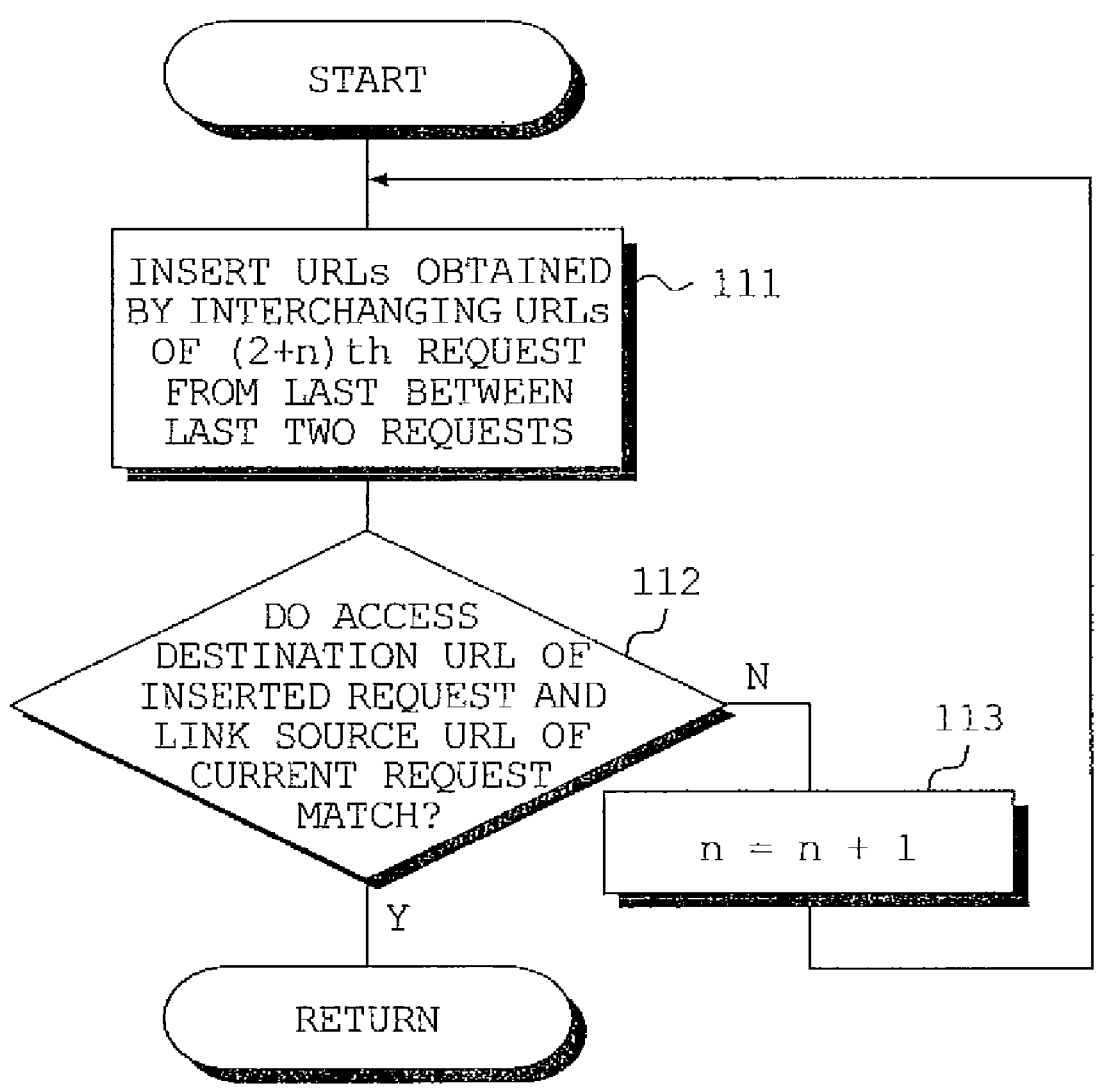
FIG. 16 is a flowchart illustrate processing for revising an access history table.

FIG. 16 is a flowchart illustrating processing (step 91 in FIG. 8) for revising access history.

As described above, if the current link source URL (the link source URL of the last request) and the immediately preceding access destination URL (the access destination URL of the request that precedes the last request) do not match, a URL combination in which the access destination URL and link source URL of the request that is (2+n)th (where the initial value of the variable n is zero) from the last request have been interchanged is generated and the generated request is inserted between the last two requests (step 111).

It is determined whether the access destination URL constituting the request of the inserted combination of URLs and the current link source URL match (step 112). If the URLs do not match ("NO" at step 112), then n is incremented so as to go back one request earlier in order to generate an access history of a web page that was restored by the "BACK" button on the grounds that a web page that was restored by the "BACK" button still remains (step 113).

Thus, by repeating the processing of steps 111 to 113, the access history of the client terminal device 1 can be ascertained by the proxy server 10 even in a case where use was made of the "BACK" button to return to the web page immediately preceding the web page currently being displayed, as described above with reference to FIGS. 10 to 15.

In the foregoing embodiment, the proxy server 10 is provided between the client terminal device 1 and the web server 20. However, in the case of a personal computer or the like having an IP address capable of being identified by the client terminal device 1, the proxy server 10 need not be provided and the client terminal device 1 and web server 20 may communicate with each other directly.

As many apparently widely different embodiments of the present invention can be made without departing from the spirit and scope thereof, it is to be understood that the invention is not limited to the specific embodiments thereof except as defined in the appended claims.

What is claimed is:

1. A server system for receiving request data, which is transmitted from a client terminal device, for a web page specified by a URL, and transmitting the data of the web page requested by the received request data to the client terminal device, said system comprising:
  an access history storage device for storing the URL of the web page, which is represented by the web page data that has been transmitted to the client terminal device in response to the request, in an access history table as an access destination URL, and storing the URL of a web page, which was being displayed on a display unit of the client terminal device when the request data was transmitted, in the access history table as a link source URL, the URLs being stored in the table in accordance with an order in which requests were made;
  a determination device for determining whether there is a non-match between a link source URL based upon a current request and an access destination URL based upon an immediately preceding request; and
  a history revising device, responsive to a determination by said determination device that there is a non-match between the URLs, for executing processing whereby a URL combination, in which a link source URL and an access destination URL that were stored in the access history table by a request previous to the immediately preceding request have been interchanged, is inserted in the access history table as a request between the current request and the immediately preceding request in reverse chronological order of requests previous to the immediately preceding request, this processing being executed repeatedly until the access destination URL of the inserted request and the link source URL of the current request match.

2. A method of controlling operation of a server system for receiving request data, which is transmitted from a client terminal device, for a web page specified by a URL, and transmitting the data of the web page requested by the received request data to the client terminal device, said method comprising:
  a step of an access history storage device storing the URL of the web page, which is represented by the web page data that has been transmitted to the client terminal device in response to the request, in an access history table as an access destination URL, and storing the URL of a web page, which was being displayed on a display unit of the terminal device when the request data was transmitted, in the access history table as a link source URL, the URLs being stored in the table in accordance with an order in which requests were made;
  a step of a determination device determining whether there is a non-match between a link source URL based upon a current request and an access destination URL based upon an immediately preceding request; and
  in response to a determination by the determination device that there is a non-match between the URLs, a step of a history revising device executing processing whereby a URL combination, in which a link source URL and an access destination URL that were stored in the access history table by a request previous to the immediately preceding request have been interchanged, is inserted in the access history table as a request between the current request and the immediately preceding request in reverse chronological order of requests previous to the immediately preceding request, this processing being executed repeatedly until the access destination URL of the inserted request and the link source URL of the current request match.

3. A non-transitory computer readable storage medium storing a program for controlling a server system for receiving request data, which is transmitted from a client terminal device, for a web page specified by a URL, and transmitting the data of the web page requested by the received request data to the client terminal device, said program controlling said server system so as to:
  store the URL of the web page, which is represented by the web page data that has been transmitted to the client terminal device in response to the request, in an access history table as an access destination URL, and store the URL of a web page, which was being displayed on a display unit of the terminal device when the request data was transmitted, in the access history table as a link source URL, the URLs being stored in the table in accordance with an order in which requests were made;

determine whether there is a non-match between a link source URL based upon a current request and an access destination URL based upon an immediately preceding request; and in response to a determination that there is a non-match between the URLs, execute processing whereby a URL combination, in which a link source URL and an access destination URL that were stored in the access history table by a request previous to the immediately preceding request have been interchanged, is inserted in the access history table as a request between the current request and the immediately preceding request in reverse chronological order of requests previous to the immediately preceding request, this processing being executed repeatedly until the access destination URL of the inserted request and the link source URL of the current request match.

4. The server system according to claim 1, wherein the client terminal device does not transmit the request data to said server system and displays a web page represented by the data stored in a cache memory of the client terminal device when a button of a browser is clicked.

* * * * *